United States Patent
Spears

(10) Patent No.: US 9,143,696 B2
(45) Date of Patent: Sep. 22, 2015

(54) IMAGING USING OFFSETTING ACCUMULATIONS

(71) Applicant: Hewlett-Packard Development Company, L.P., Houston, TX (US)

(72) Inventor: Kurt Eugene Spears, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/651,389

(22) Filed: Oct. 13, 2012

(65) Prior Publication Data

US 2014/0104464 A1   Apr. 17, 2014

(51) Int. Cl.
| | |
|---|---|
| *H04N 5/335* | (2011.01) |
| *H04N 9/083* | (2006.01) |
| *H04N 1/04* | (2006.01) |
| *H04N 5/235* | (2006.01) |
| *H04N 9/04* | (2006.01) |
| *H04N 5/225* | (2006.01) |

(52) U.S. Cl.
CPC ............ *H04N 5/2351* (2013.01); *H04N 5/2256* (2013.01); *H04N 5/2354* (2013.01); *H04N 9/04* (2013.01)

(58) Field of Classification Search
CPC .......... H04N 13/0207; H04N 13/0217; H04N 13/0257; H04N 13/0271; H04N 17/002; H04N 1/00997; H04N 1/0436; H04N 5/23245; H04N 5/23248; H04N 5/235; H04N 5/2352; H04N 5/343; H04N 5/3535; H04N 5/3559; H04N 5/357; H04N 5/359

USPC .............. 348/96, 296–297, 280, 283, 324; 345/474, 483, 505

See application file for complete search history.

(56) References Cited

U.S. PATENT DOCUMENTS

| | | | |
|---|---|---|---|
| 5,499,111 A * | 3/1996 | Sato et al. ...................... 382/252 |
| 5,748,232 A * | 5/1998 | Konuma .................... 348/219.1 |
| 7,023,536 B2 | 4/2006 | Zhang et al. |
| 7,038,846 B2 | 5/2006 | Mandella et al. |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl et al. |
| 7,268,956 B2 | 9/2007 | Mandella et al. |
| 7,327,500 B2 * | 2/2008 | Sakakibara et al. .......... 358/483 |
| 7,474,809 B2 | 1/2009 | Carl et al. |
| 7,599,561 B2 | 10/2009 | Wilson et al. |

(Continued)

OTHER PUBLICATIONS

Oike, Y. et al; A Pixel-level Color Image Sensor with Efficient Ambient Light Suppression Using Modulated RGB Flashlight and Application to TOF Range Finding; http://ieeexplore.ieee.org/stamp/stamp.jsp?arnumber=1346595; On pp. 298-301.

(Continued)

*Primary Examiner* — Trung Diep
(74) *Attorney, Agent, or Firm* — Clifton L. Anderson

(57) ABSTRACT

An imaging system includes a sensor array of sensor elements and plural accumulator sets of accumulators. Switches alternatively route detections from a respective sensor element to different accumulators of the respective accumulator set. Offset devices offset an amount read out from a first accumulator of a set by an amount read out from a second accumulator of that set.

15 Claims, 4 Drawing Sheets

(56) References Cited

U.S. PATENT DOCUMENTS

| | | | |
|---|---|---|---|
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 7,969,494 | B2 | 6/2011 | Ladd et al. |
| 8,004,502 | B2 * | 8/2011 | Keam .......................... 345/175 |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 2005/0078092 | A1 | 4/2005 | Clapper |
| 2005/0168437 | A1 | 8/2005 | Carl et al. |
| 2008/0018591 | A1 | 1/2008 | Pittel et al. |
| 2010/0289885 | A1 | 11/2010 | Lu et al. |
| 2011/0012866 | A1 | 1/2011 | Keam |
| 2011/0227915 | A1 | 9/2011 | Mandella et al. |
| 2011/0242054 | A1 | 10/2011 | Tsu |
| 2012/0019494 | A1 | 1/2012 | Lum et al. |
| 2012/0038549 | A1 | 2/2012 | Mandella et al. |
| 2013/0077236 | A1 | 3/2013 | Becze et al. |
| 2013/0194418 | A1 | 8/2013 | Gonzalez-Banos et al. |

OTHER PUBLICATIONS

Gao, Rui et al; Microsoft Research-Mobile Surface; Microsoft Research; 2010; http://research.microsoft.com/en-us/projects/mobilesurface/.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holo-graphic-3d-display-designers/#sthash.j6Ys61PX.dpbs.

Harrison, Beverly & Ziola, Ryder; Bringing Toys To Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research—IllumiShare; Microsoft Research; 2012; http://delivery.acm.org/10.1145/2210000/2208333/p1919-junuzovic.pdf?ip=15.219.153.76&id=2208333&acc=ACTIVE%20SERVICE&key=C2716FEBFA981EF153FE223D54A46A411F9E1F05F1DA6F38&CFID=271558808&CFTOKEN=96334302&_acm_=1387226323_00af7aa5e159c7c67d724c49ef01bacf.

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.

Linder; Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed for Multi-Point interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using a Depth Camera As a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

Shahram Izadi et al., "C-Slate: A Multi-Touch and Object Recognition System for Remote Collaboration using Horizontal Surfaces," Second Annual IEEE International Workshop on Horizontal Interactive Human-Computer System, 2007, pp. 3-10, IEEE.

* cited by examiner

IMAGING USING OFFSETTING ACCUMULATIONS

BACKGROUND

The colors in an image can be determined, not only by the colors of objects in the scene being imaged, but also by the colors used to illuminate the objects in the scene. Photographers often take advantage of this, e.g., by using low-color-temperature light to make skin tones appear warmer. On the other hand, if an image is to represent the actual colors of an object, illumination color can be carefully controlled. For example, document scanners use carefully specified illumination sources to achieve known effective color temperatures. In addition, typical document scanners employ covers to exclude ambient light (which is less likely to be controlled) from the object being scanned.

BRIEF DESCRIPTION OF THE DRAWINGS

The following figures represent examples and not the invention itself.

DETAILED DESCRIPTION

Excluding or otherwise controlling ambient light is not always possible. For example, when photographing a car or wall to obtain a color sample for paint matching purposes, it may not be possible to exclude or control ambient light. "White-balancing" can be used to compensate for color shifts due to ambient light color. However, this typically involves acquiring an image of a standard white sheet, which may be inconvenient. Also, such an approach may not be as effective as desired where the ambient light varies spatially over an image and over time. For example, a white-balance setting can be invalidated by a passing shadow or flickering light.

Examples described hereinbelow use accumulation offsetting to compensate for ambient light even where the ambient light varies over the imaged object and/or over time. In some examples, this approach can be used to obtain a more color-accurate image of a scene.

Figure 1:
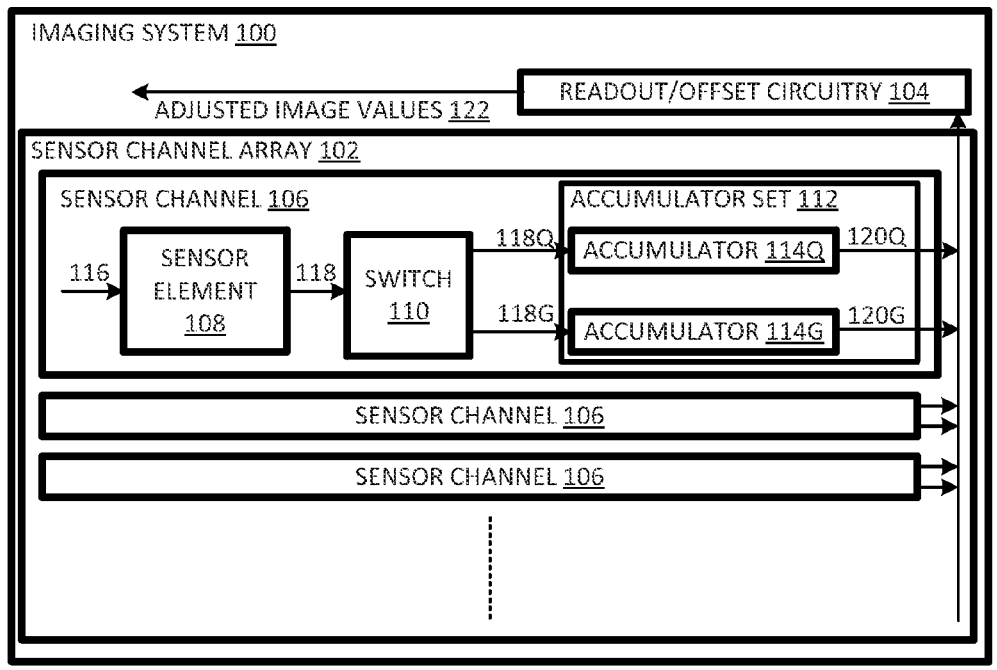
FIG. 1 is a schematic diagram of an imaging system in accordance with an example.

An imaging system 100, shown in FIG. 1, includes a sensor-channel array 102 and readout/offset circuitry 104. Sensor-channel array 102 includes an array of sensor channels 106. Each sensor channel 106 includes a respective sensor element 108, a respective switch 110, and a respective accumulator set 112 of accumulators, including a "gross" accumulator 114G and an "offset" accumulator 114Q. Herein, "gross" and "offset", when used to qualify "accumulator" and its relatives, are mnemonic labels for the way the accumulators are used.

Sensor elements 108 are to detect incident light 116 and convert it to detections. Switches 110 are to partition detections 118 into gross detections 118G and offset detections 118Q. Gross accumulators 114G are to accumulate gross detections 118G to yield gross accumulations 120G, while offset accumulators 114Q are to accumulate offset detections 118Q to yield offset accumulations 120Q. Readout/offset circuitry 104 is to read gross accumulations 120G from gross accumulators 114G and to read offset accumulations 120Q from offset accumulators 114Q. Readout/offset circuitry 104 is further to offset gross accumulations 120G by respective offset accumulations 120Q to yield adjusted image values 122.

Figure 2:
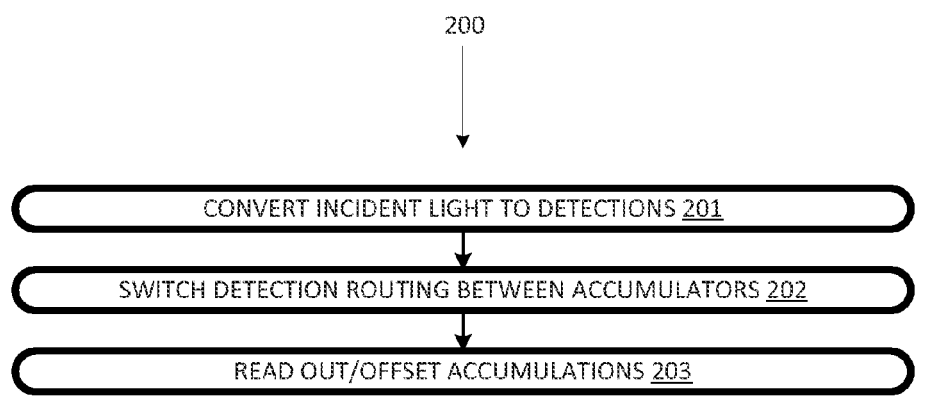
FIG. 2 is a flow chart of an imaging process in accordance with an example.

An imaging process 200, flow-charted in FIG. 2, may be implemented using imaging system 100 or another system. At 201, incident light is converted to detections. At 202, detection routings are switched between gross and offset accumulators to yield respective gross and offset accumulations. At 203, gross and offset accumulations and read out from the respective accumulators so that the gross accumulations are offset by respective offset accumulations to yield adjusted image values.

In one of several possible applications for process 200, a light source can be switched on and off to yield pulses of emitted light. Detection routings can be switched so that detections resulting from incident light that is a combination (which would occur during a pulse) of reflections of controlled illumination and ambient light are routed to gross accumulators, while detections (e.g., occurring between pulses) resulting from ambient light only are routed to offset accumulators. In that case, the resulting adjusted image values represent incident light associated only with controlled illumination, e.g., to provide accurate color intensity and hue information.

The ambient detections can occur just before and/or just after the detections of combined light. Thus, the gross and offset detections can occur close in time, minimizing challenges due to temporally varying ambient illumination. Errors due to temporally-varying ambient light can be further reduced by interleaving the gross and offset accumulations. First (e.g., "gross") and second (e.g., "offset") accumulations are said to be "interleaved" when, for a given sensor channel: 1) for some first detections in a respective first accumulator, there are second detections in a respective second accumulator that were obtained prior to the first detections and some that were obtained after the first detections; and 2) for some second detections in the respective second accumulator, there are first detections in the respective first accumulator that were obtained before the second detections and some that were obtained after the second detections.

The advantage of interleaving can be understood using an example in which 16 milliseconds (ms) are available for image capture. In a non-interleaved variation (GAQ), the first 8 ms are used for gross illumination detections and the second 8 ms are used for ambient-only illumination detections; in this non-interleaved case, there is an average of 8 ms available for compensation errors to occur due to changes in ambient illumination. As explained in the next paragraph, interleaving can reduce the average time available for changes in ambient illumination to cause ambient-light compensation errors.

In a first interleaved variation (GAGAQ), the first 4 ms are allotted to gross illumination detections, the second 4 ms are allotted to ambient illumination detections, the third 4 ms are allocated to gross illumination detections, and the fourth 4 ms are used for ambient illumination detections. In this case, there is an average of only 4 ms available for compensation errors to occur due to changes in ambient illumination. In a further example of interleaving, in which 1 ms is allocated to each phase of the pattern GAGAGAGAGAGAGAGAQ, there is an average of only 1 ms for compensation errors to occur due to changes in ambient illumination. Thus, compensation errors due to temporal variations in ambient lighting can be reduced to the extent that interleaving temporally overlaps the gross and ambient illumination detections between readouts.

The ambient-light compensation is on a per-sensor-channel basis, which addresses the challenge of spatially-varying ambient illumination. In a variation in which all sensor channels have the same color sensitivity, system 100 compensates for the amount of ambient illumination incident to the respective sensor element. In a variation in which sensor channels are dedicated to different colors, e.g., due to the use of color filters with otherwise full-range sensor elements 108, system 100 can address spatial variations in the color temperature of the ambient illumination. In the following example, spatial variations in ambient illumination are addressed in a system in which all sensor channels have the same color sensitivity by using sequential illumination using different colors.

Figure 3:
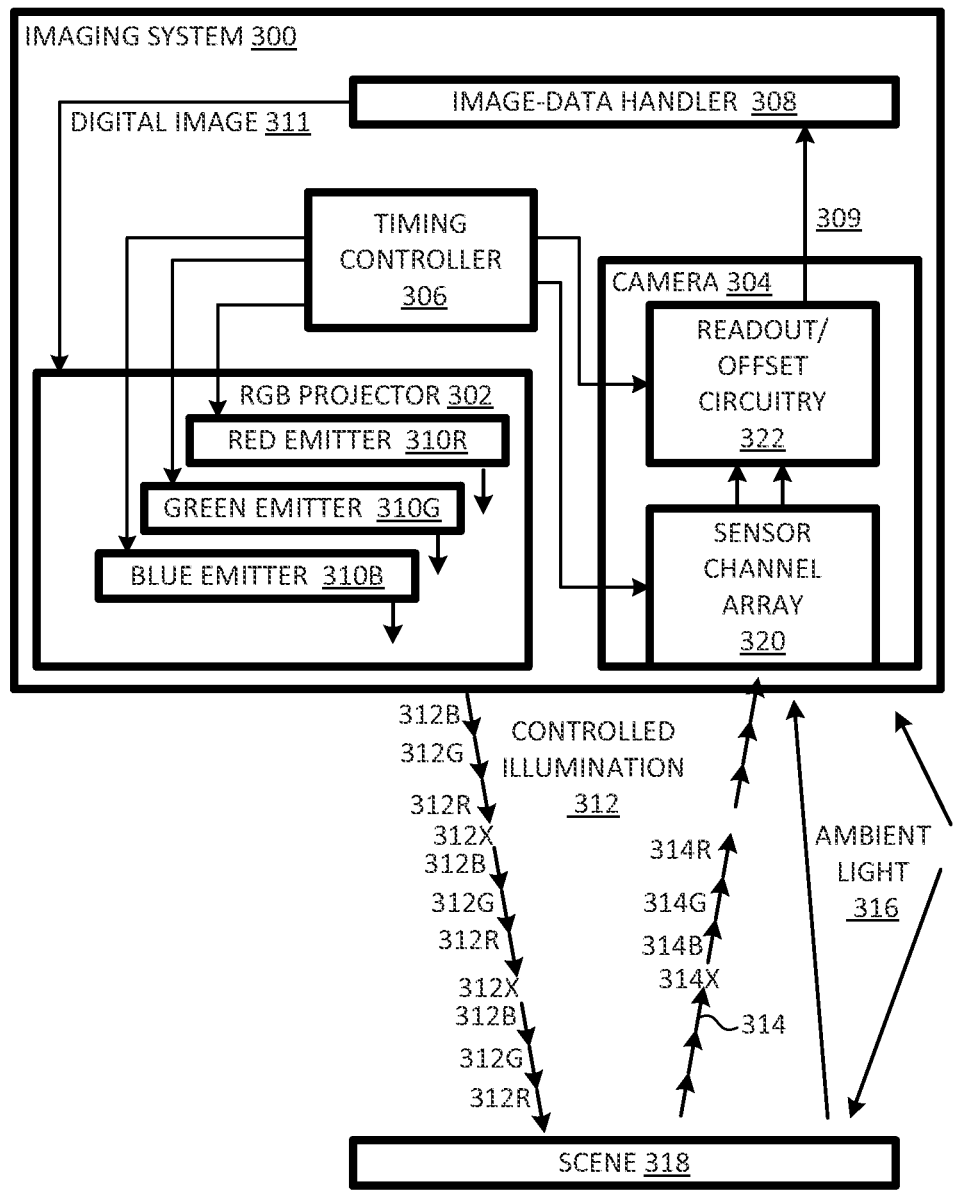
FIG. 3 is a schematic diagram of a full-color imaging system in accordance with an example.

An example full-color imaging system 300 includes an RGB projector 302, a camera 304, a timing controller 306, and an image-data handler 308, as shown in FIG. 3. Timing controller 306 synchronizes (coordinates the timings of) RGB projector 302 and camera 304. Image-data handler 308 receives image data values 309 from camera 304, uses the image-data values to assemble digital images 311, and transmits digital images 311 to RGB projector 302 to generate visible images, e.g., with which a user can interact. In an alternative example, an image data handler is used to store digital images or transmit them to another system, but is not used to transmit them to an RGB projector.

RGB projector 302 provides red, green, and blue illumination on a time-sequential (one-at-a-time) basis to yield, in effect and on a time-averaged basis, (white) illumination 312 with controlled and known color characteristics. To this end, RGB projector 302 includes a red emitter 310R for emitting red illumination. 312R, a green emitter 310G for emitting green illumination 312G, and a blue emitter 310B for emitting blue illumination 312B. Gaps 312X (in controlled illumination output by RGB projector 302) can be formed during durations (phases) in which emitters 310R, 310G, and 310 B are all off.

Emitters 310R, 310G, and 310B can be arrays, e.g., of light-emitting diodes (LEDs), so that they can be operated to generate either image-bearing illumination (light in which an image can be seen under some circumstances) or non-image-bearing illumination. Alternatively, white illumination can be used, e.g., with Bayer filters to provide color illumination or images. Non-image-bearing illumination, e.g., uniform illumination, can be used when illuminating objects to be imaged using camera 304. Image-bearing illumination can be used to project an image on a surface, e.g., so that a user can interact with the image. The interactions can be captured using camera 304 and interpreted using image data handler 308 to yield an updated image. In this way, a projected image can serve as a virtual object, e.g., one that can be shared among remote users in a collaborative work environment. In either case, camera 304 can detect a controlled component 314 of incident light, which can include red segments 314R, green segments 314G, blue segments 314B, and gaps 314X.

Light incident camera 304 can also include ambient light 316, including both direct and reflected ambient light. Gaps 312X in controlled illumination result in gaps 314X in the controlled component of light incident camera 304. During gaps 314X, camera 304 detects only incident ambient light 316. During color phases 312R, 312G, 312B, camera 304 detects a combination of controlled-illumination reflections 314 and ambient light 316. The scene 318, which may include an object, an image, and/or interactions to be imaged, is presumably accurately represented by the controlled-illumination reflections, while ambient light 316 is a source of noise and/or distortion.

Camera 304 includes a sensor-channel array 320 and readout/offset circuitry 322. Sensor-channel array 320 is to convert incident light into detections and to accumulate detections so that they are partitioned as a function of the color phase (e.g., R, G, B, or X) of the controlled component of incident light.

Figure 4:
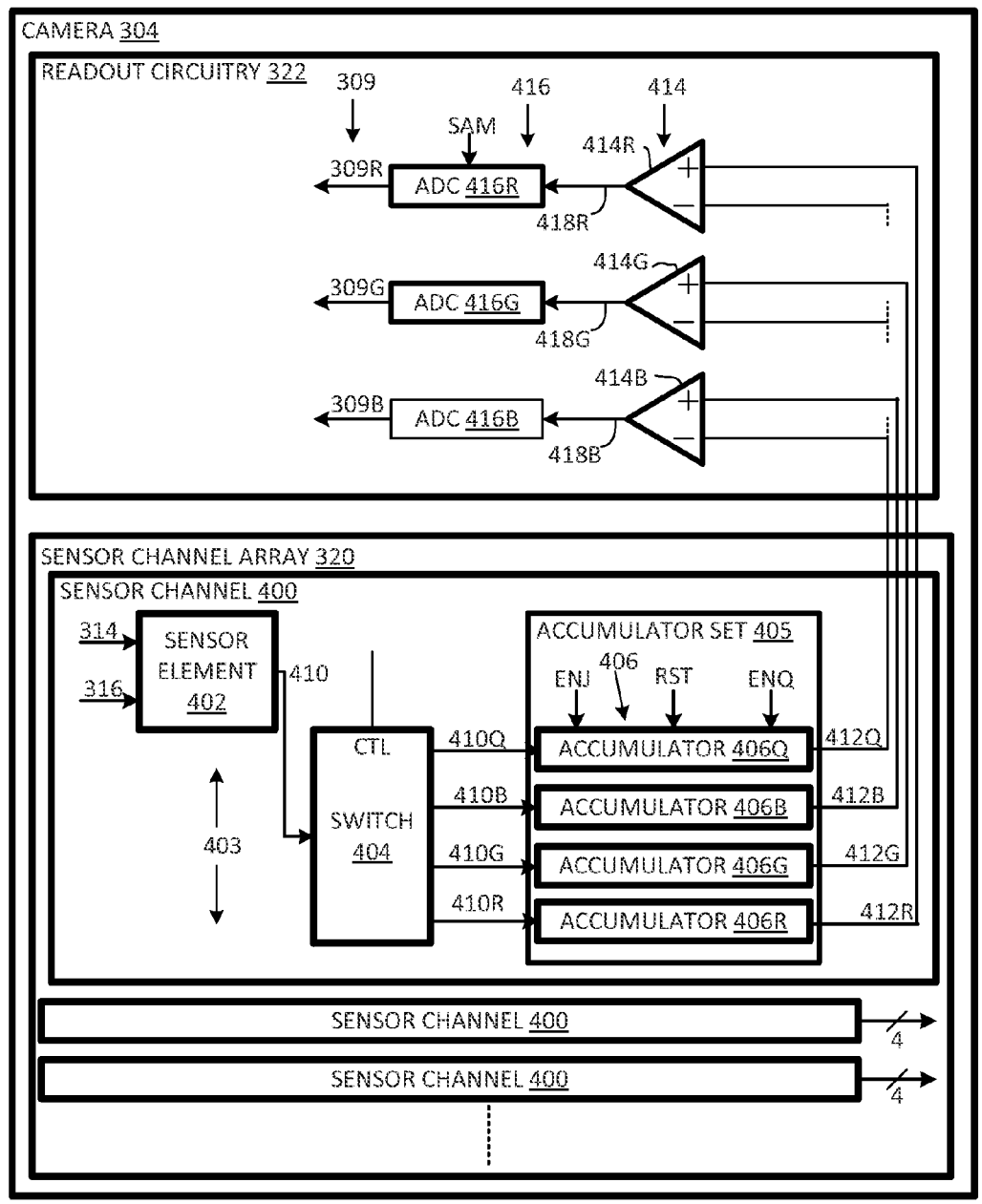
FIG. 4 is a schematic diagram detailing a camera of the imaging system of FIG. 3.

Camera 304 is represented in greater detail in FIG. 4. Sensor-channel array 320 is a two-dimensional array of sensor channels 400. Each sensor channel 400 includes a sensor element 402, a switch 404, and an accumulator set 405 of accumulators 406. Each accumulator set 405 includes a "red-dedicated" accumulator 406R, a "green-dedicated" accumulator 406G, a "blue-dedicated" accumulator 406B, and an "ambient-dedicated" (i.e., "offset-dedicated") accumulator 406Q. Herein, the accumulators are labeled to reflect the source of the detections they are intended to accumulate, e.g., red-dedicated accumulator 406R accumulates detections generated from incident light including reflections 414R of red illumination 412R.

Collectively, sensor elements 402 define a sensor array 403. Each sensor element 402 is to convert incident light, e.g., including ambient light 316 and/or reflections 314 of controlled illumination, to detections 410, e.g., electrical charges. Each switch 404 is to route detections as a function of the color-phase of the incident light from which, the detections were generated. For example, detections resulting from reflections of green emissions 312G are directed to green-dedicated accumulator 406G. To this end, timing controller 306 (FIG. 3) is coupled to emitters 310R, 310G, and 310B and to a control port CTL of each switch 404 to synchronize (i.e., coordinate the timings of) emissions and routings. Thus, switch partitions detections 410 into red, green, blue, and offset detections 410R, 410G, 410B, and 410Q.

Each accumulator 406 is to accumulate detections routed to it by the respective switch 404 to yield respective accumulations. More specifically, red-dedicated accumulator 406R accumulates detections 410R to yield an accumulation 412R; green-dedicated accumulator 406G accumulates detections 410G to yield an accumulation 412G; blue-dedicated accumulator 406B accumulates detections 410B to yield an accumulation 412B; and ambient-dedicated accumulator 406Q accumulates detections 410Q to yield an accumulation 412Q. In an alternative example, one or more additional accumulators may be included, e.g., an IR-dedicated accumulator to accumulate detections generated in response to incident infra-red light; for example, the infra-red light may have been emitted by a projector or by a separate source such as an infra-red pen used to (virtually) annotate an object or image.

In an example, an integrating capacitor can be used to store accumulated detections in the form of charges. In other examples, the detections and accumulators can take other forms. For example, the detections can take the form of light pulses and the accumulators can include counters to tally light pulses.

Each accumulator 406 includes an input enable port ENJ, a reset port RST, and an output enable port ENQ. In imaging system 300 (FIG. 3), all these ports are controlled by timing controller 306. Input enable port ENJ can be controlled to determine, at any given time, whether an accumulator accepts new detections at its input. Output enable port ENQ can be controlled to determine, at any given time, whether the accumulation accumulated therein can be read out, e.g., by readout circuitry 322. Reset port RST can be controlled to reset the respective accumulator to an initial state corresponding to zero accumulation.

Sensor-channel array 320 can be a backside-illuminated CMOS sensor. Sensor elements 402 can be fabricated as an array on the backside of a CMOS integrated circuit, while switches 404 (e.g., transistor-based structures) and accumulators 406 are fabricated on the front side. This allows a full surface to be dedicated to detecting incident light. In other examples, other sensor technology can be used for the sensor-channel array. In some examples, readout circuitry is formed on the same integrated circuit as a sensor-channel array in other examples, separate integrated circuits are used.

Readout circuitry 322 includes amplifiers 414 and analog-to-digital converters (ADCs) 416. Amplifiers 414 include a red-dedicated amplifier 414R, a green-dedicated amplifier 414G, and a blue-dedicated amplifier 414B. Each amplifier 414R, 414G, 414B has a positive input coupled to an output of a respective accumulator 406R, 406G, and 406B. Each amplifier 414R, 414G, and 414B has a negative input coupled to an output of offset accumulator 406Q. As a result of this configuration, amplifiers 414R, 414G, and 414B output respective adjusted red, green, and blue accumulator values 418R, 418G, and 418B that represent incident light components attributable to controlled illumination 312 (FIG. 3) with contributions from ambient light 316 to the total incident light removed.

ADCs 416 convert the adjusted (ambient-light-compensated) accumulations to adjusted (ambient-light-compensated) image-data values 309. Thus, red-dedicated ADC 416R outputs adjusted red-component image data values 309R; green-dedicated ADC 416G outputs adjusted green-component image data values 309G; and blue-dedicated ADC 416B outputs adjusted blue-component data values 309B. In an alternative example, a single ADC stage sequentially reads out and converts adjusted RGB values from respective offset amplifiers or other offset elements. Output enable ports ENQ of accumulators can be used to determine which accumulator is being output.

Image data values 309 are provided to image-data handler 308 (FIG. 3), which uses the received image data values to construct digital images 311 (FIG. 3). Depending on the implementation, image-data handler 308 may store digital images 311, transmit them to projector 310, and/or transmit then to another system for display. Since offsetting occurs "upstream" of the conversion to digital, the offsetting is said to occur in the "analog domain". Analog offsetting adds negligible latency to image capture. In an alternative example, offsetting occurs in the "digital domain", i.e., digital offsetting occurs downstream of ADCs that convert accumulations to digital values.

As represented in FIG. 4, readout circuitry 322 serves all sensor channels 400. Alternatively, there can be separate readout/offset circuitry for each sensor channel. In that case, each sensor channel may be thought of as including readout/offset circuitry. In another example, each sensor channel can includes a respective analog offset circuit, e.g., amplifier, while each ADC serves all sensor channels. Other variations are provided as well. For example, each ADC or each combination of ADC and offset circuit can serve plural, but less than all, sensor channels.

Figure 5:
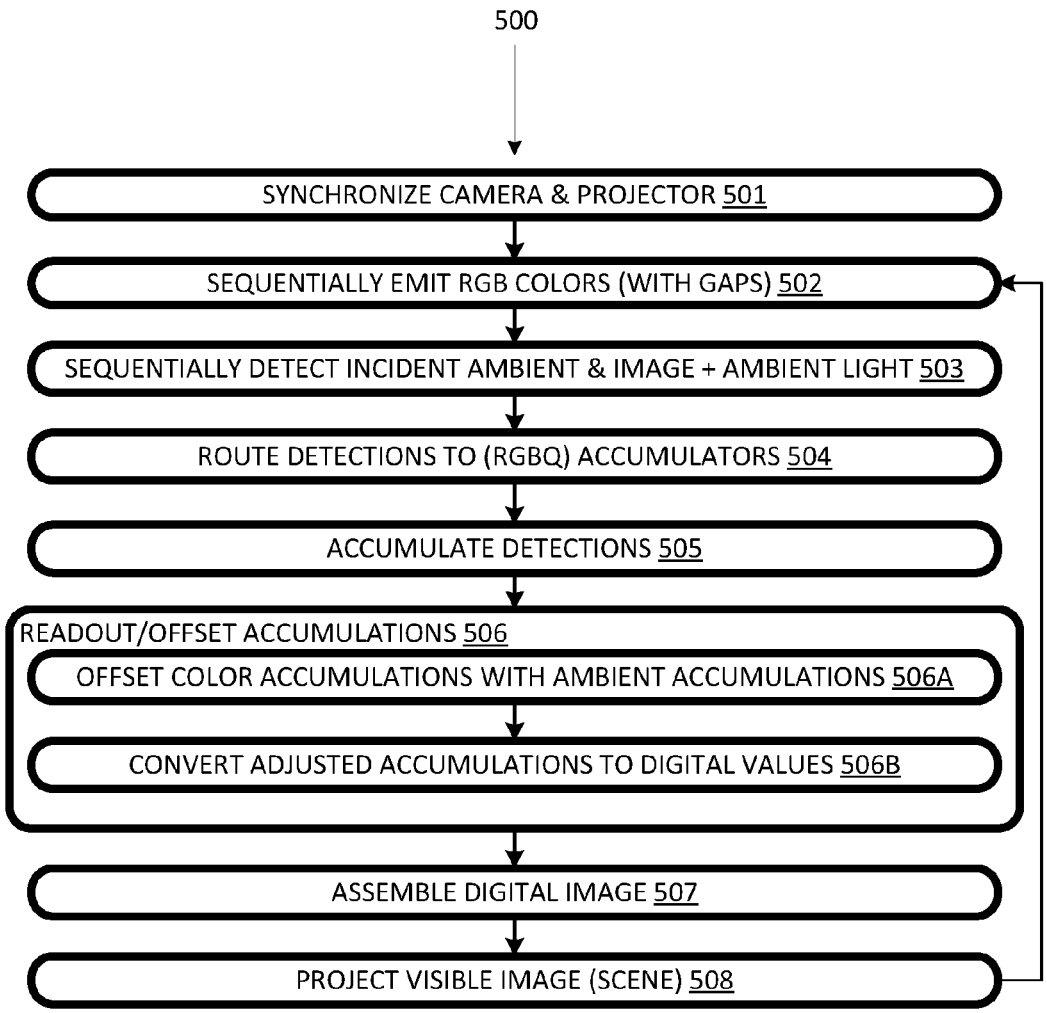
FIG. 5 is a flow chart of an imaging process implementable using the imaging system of FIG. 3 in accordance with an example.

An imaging process 500, flow charted in FIG. 5, can be implemented using imaging system 300 or another imaging system. At 501, a camera and a projector are synchronized. In the context of imaging system 300, this can include programming or otherwise configuring timing controller 306 so that RGB projector 302 and camera 304 can carry out the rest of imaging process 500.

At 502, RGB colors are sequentially emitted along with gaps. In the context of imaging system 300, this can include timing controller 306 sequentially activating emitters 310R, 310G, and 310B, leaving one or more gaps per RGB color cycle. For example, the emission pattern can consist of repetitions of the pattern element RGBX, where "X" marks a gap. Other repeating patterns are also provided for: for example, the emission pattern can include pattern elements such as RXGXBX where a gap is inserted between successive color emissions.

In some examples, the durations of the (RGBX) color phases have equal durations; in other examples, the gaps can have durations that differ from the RGB phase durations. In still other examples, the RGB phases may differ in duration. For example, a blue phase can be longer than a red phase, e.g., to compensate for a blue emitter of lower intensity than the red emitter. Where the gap duration is different from one or more of the RGB color phase durations, some scaling, e.g., of the offset accumulations, may be used to compensate for the duration differences.

Note that the emitted RGB light may be image bearing, e.g., include R, G, and B separations of an image. Alternatively, the emitted RGB light may be non-image bearing. For example, nominally uniform light can be used to illuminate a document or other physical object for image capture.

At 503, incident light is detected. During emission gaps, only ambient light is detected; during RGB color phases, ambient light plus reflections of controlled RGB emissions are detected. The ambient and ambient+illumination (ambient together with reflections of controlled emissions) are detected in different time intervals, i.e., "sequentially".

At 504, incident light detections are sequentially routed to (and, thus, partitioned among) accumulators. In the context of imaging system 300, timing controller 306 controls RGB projector 302 and switches 404 so that detections are routed to accumulators as a function of the color phase of the incident light. For example, detections 410R, resulting from incident light including a component that is a reflection 314R of a red emission 312R, are routed to red accumulator 406R. For another example, detections 410Q, resulting from incident light including only ambient light, i.e., during gaps 314X, are routed to offset-dedicated (ambient-light-dedicated) accumulator 406Q. The accumulations of detections in respective accumulators are mutually exclusive in that no accumulator includes detections routed to another accumulator.

At 505, detections are accumulated to yield accumulations. For example, in the context of imaging system 300, detections 410R are accumulated to yield accumulations 412R. In general, the detections are accumulated in an accumulator to which they are routed and which has its input ENJ enabled. Accumulations increase as detections are received and remain constant when detections are not being received. For example, charges accumulate in an integrating capacitor as they are received. Activation of the reset port RST resets an accumulator to zero. A reset is typically performed after a readout from the respective accumulator. For example, a typical accumulator pattern would include repetitions of the pattern element RGBQ-readout-reset.

At 506, accumulations are read out from accumulators and offset. In the context of imaging system 300, the reading out and offsetting are performed by circuitry 322. In one example, this can include offsetting R, G, and B accumulations with ambient/offset accumulations to yield adjusted ambient-light-compensated R, G, and B accumulations at 506A. In cases where all (RGBX) phases are of equal duration, the offset can be implemented as a simple subtraction. Some scaling can be required when offsetting RGBX color phases of different durations. The adjusted accumulations can then be converted to digital-image values at 506B. In other examples, the conversion to digital precedes the offsetting, so that the offsetting occurs in the digital domain instead of the analog domain.

The duration between readouts can determine a frame rate where the digital image values are to be used for video images. For example, a frame rate of about 30 frames per second is typically experienced as "smooth" by most viewers, although faster and slower frame rates have their uses. For a given readout duration, the number of color-phase cycles during the readout duration determines the opportunity for color errors to occur due to time variations in ambient lighting. If there are two or more color-phase cycles per readout duration, the accumulations will be interleaved, that is, overlapped in time. The more color-phase cycles per readout duration, the more highly interleaved the accumulations and the less opportunity for color errors to occur due to time variations in ambient lighting.

At 507, a digital image is constructed using the image data values. In the context of system 300, image-data handler 308 constructs a raster digital image 311 from the red, green, and blue image-data values 309R, 309G, and 309B. At 508, the digital image can be used to project a visible image. In the context of imaging system 300, digital image 311 can be input to RGB projector 302, which then projects a visible image onto a surface to yield a version of scene 318. Scene 318 may thus include virtual objects with which a human can interact, e.g., in a context of remote collaboration.

In alternative examples, the digital image is not used to re-project the captured image. For example, the captured image may simply be stored and it may be transmitted to another system for display. The scene and interactions can then be captured in future interactions of actions 502-508.

In summary, color errors due to spatial variations in ambient lighting are minimized since ambient light levels are compensated for on a pixel-by-pixel (i.e., per sensor-element) basis. Color errors due to temporal variations in ambient lighting are minimized since ambient light levels are compensated for on a per-readout period basis. Further reductions in color errors due to temporal variations in ambient lighting are achieved to the extent accumulations are interleaved (e.g., by using short-duration color phases to achieve multiple color-phase cycles per readout duration).

Herein, a "system" is a set of interacting non-transitory tangible elements, wherein the elements can be, by way of example and not of limitation, mechanical components, electrical elements, atoms, physical encodings of instructions, and process actions. Herein, "process" refers to a sequence of actions resulting in or involving a physical transformation. Herein, "device" refers to a programmable or non-programmable hardware element.

Herein, "imaging" encompasses capturing, manipulating, and/or generating an image. Herein, "image" encompasses digital images and visible images. A "visible" image is a spatial distribution of light perceptible to humans. A "digital image" is a computer-readable data structure that represents a visible image.

Herein, a "projector" is a device for projecting image-bearing or non-image-bearing light. Thus, "projector" encompasses conventional slide and movie projectors as well as their digital equivalents (that project images encoded as data). However, "projector", as used herein, also includes non-imaging light sources including simple light-emitting diodes (LEDs), and RGB LEDs, such as those used for object illumination, e.g., for document capture or other object imaging.

"Color-sequential illumination" and related phrases such as "sequentially emitting" and "sequentially projection" refer to emitting different colors at different times in a sequence to achieve time-averaged perceptions of combination color. For example, red, green, and blue can be projected in sequence to yield a time-averaged perception of white (or other color, depending on the relative amounts of red, green, and blue).

Herein, a "sensor" is a device for converting incident light into "detections". Herein, a "detection" is a representation of an amount of incident light generated by a sensor or sensor element. A "sensor" can include sensor elements, e.g., arranged in an array, each of which converts locally incident light to another form, e.g., to capture an image. Herein, a "sensor channel" includes a sensor element and other elements dedicated to handling detections or resulting data associated with that sensor element to the exclusion of other sensor elements in the same sensor array.

Herein, "detection of light of a given color" means that a detection results when light of that color is incident the sensor; it does not necessarily mean that the detection is any different than a detection of light of a different color. For example, a detection (e.g., in the form of an electrical charge) of red light can be indistinguishable from a detection (e.g., in the form of an electrical charge) of blue light. Thus, a "full-range" sensor is a sensor that can detect light of all colors of interest. This is in contrast to color-specific filters, which because of their characteristics or because of the presence of color filters (e.g., in a Bayer pattern) detect only a respective one of plural colors of interest (e.g., the other colors may be detected by other sensors in the same array).

Herein, an "accumulator" is a device for accumulating or counting detections. Herein, a "set" requires at least two elements (e.g., accumulators) as members. Sets are "mutually exclusive" when they have no elements/members in common. Herein, a "switch" is a device for selectively coupling one of its plural outputs at a time to its input according to a value of a signal at its control port.

Herein, unless otherwise apparent from context, the terms "red", "green", "blue" and "offset" are used as labels that refer to the function to which an item described is dedicated rather than the physical characteristics of that item. For example, while red emissions are red in color, red detections, red accumulators, red accumulations, red amplifiers, and red ADCs are not red in color. In those contexts, the term "red" relates back to the emission color that they correspond to functionally. For example, red accumulator 406R accumulates red detections 410R that were generated from incident light including reflections 314R of red emissions 312R.

In this specification, related art is discussed for expository purposes. Related art labeled "prior art", if any, is admitted prior art. Related art not labeled "prior art" is not admitted prior art. In the claims, "said" introduces elements for which there is explicit verbatim antecedent basis; "the" introduces elements for which the antecedent basis may be implicit. The illustrated and other described embodiments, as well as modifications thereto and variations thereupon are within the scope of the following claims.

The invention claimed is:
1. An imaging system comprising:
a sensor array of sensor elements;
plural accumulator sets, each of said accumulator sets including plural accumulators, each of said accumulators being configured to accumulate detections;

switches to partition detections from a respective sensor element into detection sets and to route each detection set to at most one accumulator of the respective accumulator set so that said different accumulators respectively accumulate different respective detections; and offset devices, said offset devices including circuitry, each offset device being to read out accumulations from said accumulators and to offset an amount read out from a first accumulator of a set by an amount read out from a second accumulator of that set.

2. An imaging system as recited in claim 1 further comprising:
   a projector for providing color-sequential illumination; and
   a timing controller for synchronizing said projector and said switches so that said switch routes detections as a function of the presence and color of said color-sequential illumination from which detections are respectively generated.

3. An imaging system as recited in claim 2 wherein said projector is to sequentially project red illumination, green illumination, blue illumination and gaps with no illumination, said switch routing detections associated with said red, green, blue, and gaps respectively to red-dedicated, green-dedicated, blue-dedicated, and offset-dedicated accumulators.

4. An imaging system as recited in claim 3 wherein each of said sensor elements is to detect red, green, and blue components of incident light.

5. An imaging system as recited in claim 4 wherein each of said sensors is to detect infra-red light, said accumulators further include an IR-dedicated accumulator to accumulate detections generated by detections of incident infra-red light.

6. An imaging system as recited in claim 3 wherein said sensor elements are arranged in plural mutually-exclusive subarrays, at least one of which is dedicated to detecting red components of incident light, at least one of which is dedicated to detecting green components of incident light, and at least one of which is dedicated to detecting blue components of incident light.

7. An imaging system as recited in claim 1 wherein the offsetting an amount is performed in the analog domain.

8. An imaging process comprising:
   detecting light at a sensor array of sensor elements to yield detections from each sensor element;
   for each sensor element, partitioning detections by the sensor element into detection sets and routing each detection set to at most one accumulator such that a first detection set is routed to a first respective detection accumulator to accumulate a first accumulation and a second detection set is routed to a second respective detection accumulator to accumulate a second accumulation; and
   for each sensor element, reading out said accumulators so that a first amount read out from the first respective accumulator is offset by a second amount read out from the second respective accumulator to yield an adjusted amount.

9. An imaging process as recited in claim 8 wherein said first and second accumulations are mutually interleaved prior to the time they are read out.

10. An imaging process as recited in claim 9 further comprising:
    switching a light source of emitted light on and off to yield pulses of emitted light;
    said detecting light including detecting reflections of said emitted light and ambient light to generate said detections;
    said routing including,
       only while said source is on, routing said detections to a first detection accumulator; and
       only while said source is off, routing said detection to a second detection accumulator.

11. An imaging process as recited in claim 8 further comprising sequentially projecting red, green, and blue illumination, with gaps to establish a color cycle with red, green, blue, and ambient color phases of light incident said sensor array.

12. An imaging process as recited in claim 11 wherein said red, green, and blue illumination is image-bearing.

13. An imaging process as recited in claim 11 wherein said red, green, and blue illumination is non-image-bearing.

14. An imaging process as recited in claim 8 wherein the offsetting occurs in the analog domain so that said adjusted amount is an analog value.

15. An imaging process as recited in claim 14 further comprising converting said adjusted amount to a digital value.

* * * * *